United States Patent [19]

Sakurai et al.

[11] Patent Number: 5,293,362
[45] Date of Patent: Mar. 8, 1994

[54] OPTICAL DISC PLAY-BACK DEVICE OF THE CAROUSEL TYPE, HAVING A MECHANISM FOR REDUCING ACCESS TYPE TO ANY SELECTED DISC

[75] Inventors: Jun Sakurai; Toshiyuki Kajikano, both of Shirakawa, Japan

[73] Assignee: Nippon Columbia Co., Ltd., Kawasaki, Japan

[21] Appl. No.: 894,797

[22] Filed: Jun. 4, 1992

[30] Foreign Application Priority Data

Jun. 4, 1991 [JP] Japan ................... 3-159423

[51] Int. Cl.$^5$ .............................. G11B 17/22
[52] U.S. Cl. ....................... 369/30; 369/37; 369/75.2
[58] Field of Search ............ 360/98.01, 98.02; 369/37, 34, 36, 75.1, 75.2, 30

[56] References Cited

U.S. PATENT DOCUMENTS

| | | | |
|---|---|---|---|
| 4,670,866 | 6/1987 | Hasegawa et al. | 369/37 X |
| 5,115,419 | 5/1992 | Akiyama et al. | 369/37 |
| 5,136,570 | 8/1992 | Takai et al. | 369/75.1 X |
| 5,157,648 | 10/1992 | Okamoto et al. | 369/75.2 |
| 5,193,079 | 3/1993 | Ko et al. | 369/37 |

*Primary Examiner*—Edward K. Look
*Assistant Examiner*—Hoang Nguyen
*Attorney, Agent, or Firm*—Young & Thompson

[57] ABSTRACT

An optical disc playback device of the so-called "carousel" type comprises a disc transport turntable rotatably mounted within the player housing. The underside of the turntable has an annular ridge with notches formed therein, and the housing comprises a photocouple which detects the presence or absence of the notches. The notches are so configured that each disc-holding section of the turntable has a distinct set of notches associated therewith, and each set of notches includes a central position-indicating notch and disc number-indicating notches disposed symmetrically on both sides of the central position-indicating notch.

19 Claims, 6 Drawing Sheets

OPTICAL DISC PLAY-BACK DEVICE OF THE CAROUSEL TYPE, HAVING A MECHANISM FOR REDUCING ACCESS TYPE TO ANY SELECTED DISC

BACKGROUND OF THE INVENTION

1. Field of the Invention

The present invention relates to a play-back device for optical discs of the so-called "carousel" type, in which a plurality of discs are mounted on the turntable of a tray. More particularly, the present invention relates to such a playback device in which any selected one of the plurality of discs may be randomly designated for playing, with a short access time.

2. Description of the Prior Art

Figure 5:
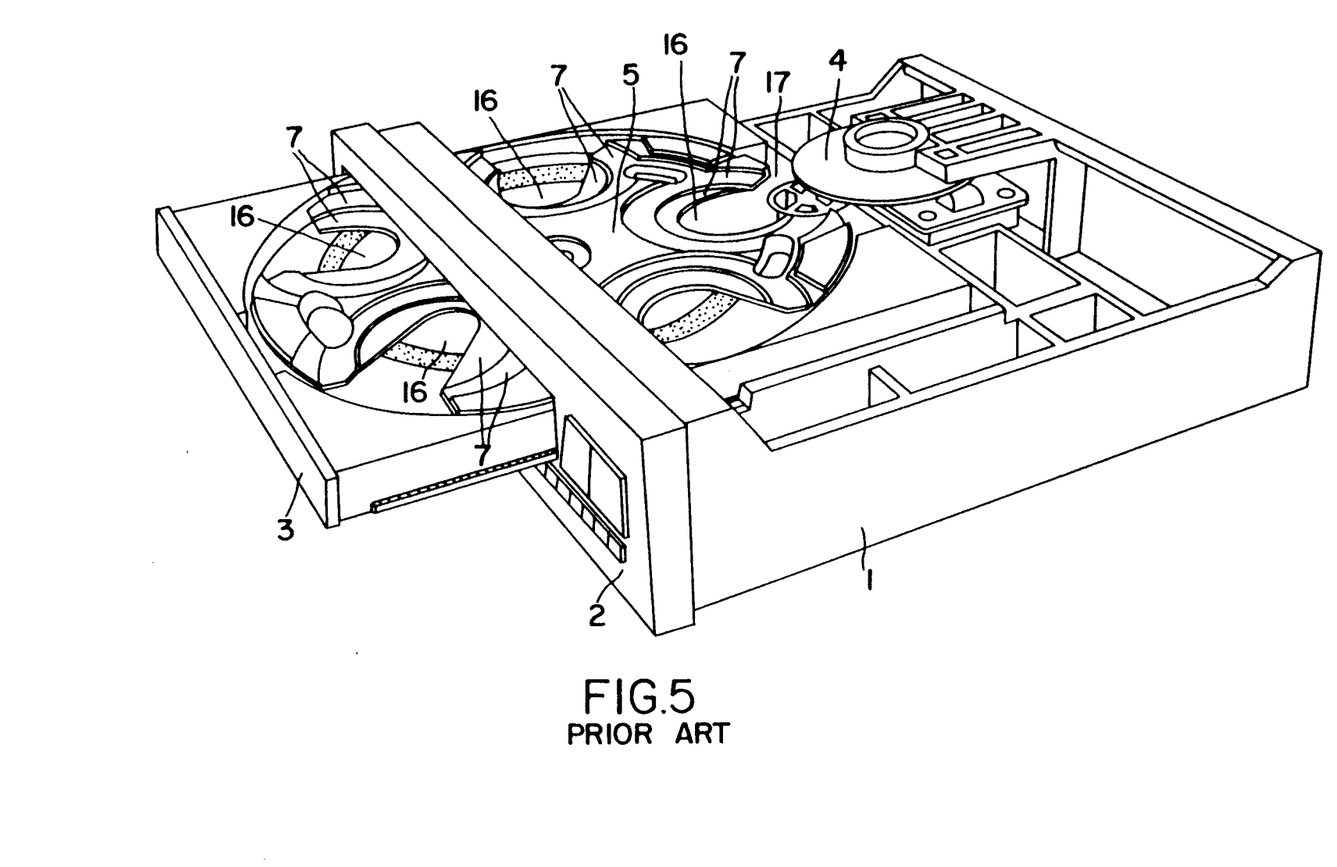
FIG. 5 is a perspective view showing the inner workings of a carousel-type optical disc player according to the prior art.
Figure 6:
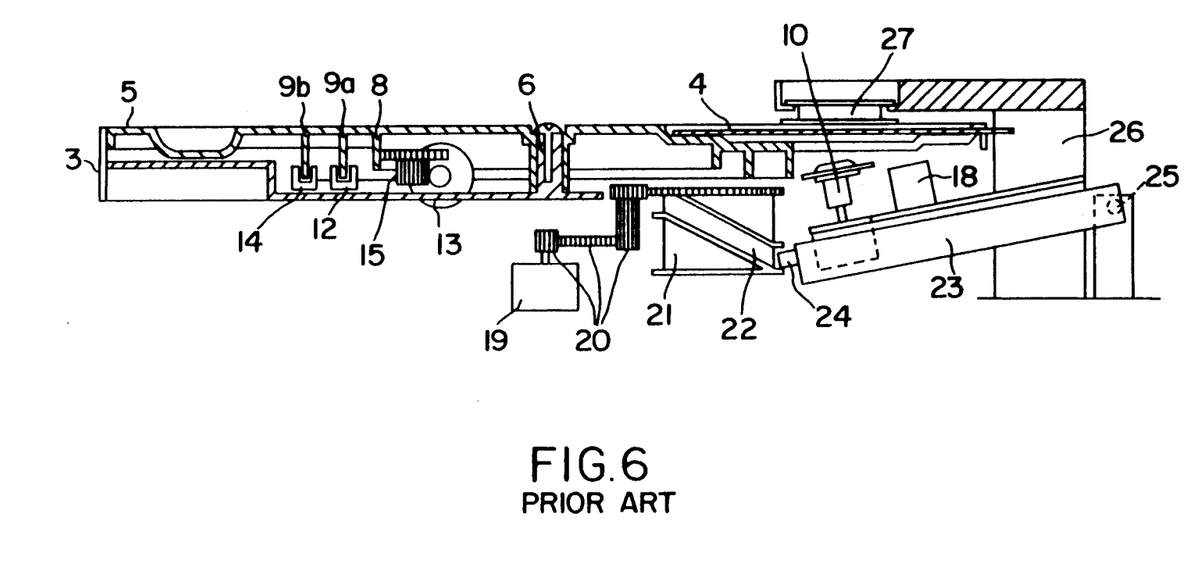
FIG. 6 is an axial section taken through the disc transport and reading components of the prior art player of FIG. 5.
Figure 7:
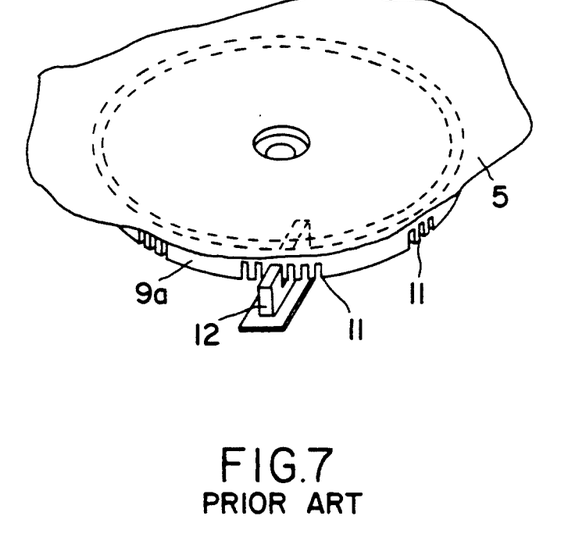
FIG. 7 is a partial perspective view showing some of the components for detecting the angular position of the disc transport turntable in the prior art device.

FIGS. 5-7 show a carousel-type optical disc play-back device according to the prior art. In particular, FIG. 5 shows in perspective the inner workings of such a play-back device, in which the player is generally designated 1, and includes a front control panel 2. A tray 3 is provided which is caused to move in and out of the front panel 2 like a drawer, in response to actuation of a corresponding control button on the front panel 2 of the player 1. The tray 3 holds a plurality of discs 4, which in this example is five discs 4.

The tray 3 comprises a disc transport turntable 5. FIG. 6, which is an axial section through the disc transport and reading mechanisms of the player of FIG. 5, shows that the disc transport turntable 5 is mounted for rotation about a boss 6 which extends from the center of tray 3. The disc transport turntable 5 has a circular series of disc holding sections 7, corresponding in number to the number of discs 4 which may be held by the player, and it will be noted that each holding section 7 is capable of holding a disc of either of two different sizes.

On its underside, the disc transport turntable 5 is provided with an annular rib 8 which forms a rack by which to transmit a driving force for rotating the turntable 5, as well as two concentric annular ribs 9a and 9b disposed radially outwardly of the rib 8, and which are used to determine the angular position of the turntable 5.

As shown in FIG. 7, the position-determining rib 9a has notches 11 corresponding to each disc-holding section 7, to ensure that any selected disc 4 is correctly transferred to the disc rotation turntable 10, from its respective disc-holding section 7. FIGS. 6 and 7 show that a photocoupler 12 is so disposed as to straddle the annular rib 9a, for detecting the occurrence of a notch 11 and emitting a corresponding control signal, thereby to control the driving motor 13 which rotates the disc transport turntable 5 via gear 15 and the rack formed on annular rib 8.

In addition, a notch is formed on the outer annular rib 9b, to enable determination of a standard position of the disc transport turntable 5, using the output from a further photocoupler 14. Since the disc transport turntable 5 is rotated in a specified direction via annular rib 8, and the motor 13 and gear 15 installed on tray 3, an accurate position determination is produced, after rotating the turntable 5 by a predetermined angle, by having the next notch emit a control signal from photocoupler 12. In this manner, turntable 5 is gradually rotated to enable an exchange of discs 4 at the disc rotating turntable 10.

Each of the disc-holding sections 7 of the disc transport turntable 5 is provided with a radially-outwardly opening slot 16. When the tray 3 is stored inside the main body of the player 1, the opening 17 formed in the rear side of tray 3 is aligned with the slot 16 of one of the disc-holding sections 7, such that the disc rotation turntable 10 and optical pickup 18 are also axially aligned with the opening 17 and its aligned slot 16.

When the tray 3 is set at a predetermined position, the motor 19 shown in FIG. 6 is activated, and the output of motor 19 is transmitted through a gear set 20 to cause rotation of a cylindrical lift cam 21. Lift cam 21 is provided with a peripheral spiral groove 22 about its cylindrical outer wall, as well as an annular gear on its top for meshing with the aforementioned gear set 20.

Sub-chassis 23 shown in FIG. 6 carries the optical pickup 18 and disc rotation turntable 10, and is mounted for up and down pivotal movement about pin 25. Upon rotation of the lift cam 21, projection 24 secured to sub-chassis 23 is guided into the spiral groove 22, such that the sub-chassis 23 is guided in its up and down pivotal movement about pin 25. As the sub-chassis 23 is pivoted upwardly, the disc rotation turntable and optical pickup 18 rise and enter into opening 17 of tray 3 and slot 16 of the aligned disc holding section 7. With a further rise of sub-chassis 23, the disc rotation turntable 10 contacts the central hole of disc 4, causing disc 4 to separate from its disc-holding section 7. Subsequently, a disc clamp 27 extending downwardly from chassis 26 clamps disc 4 in such a manner that disc 4 faces turntable 10. At this point, disc turntable 10 commences rotation of disc 4, and data is retrieved from disc 4 by means of the optical pickup 18, in a known manner.

In the prior art disc player described above, after a disc has been placed in the disc transport turntable of the tray, verification of the standard position of the disc transport turntable must be performed before any disc can be played, by rotating the disc transport turntable and using the notches in the annular rib, together with the photocoupler, to establish the standard position. Next, the disc transport turntable must be further rotated such that the disc-holding section holding the selected disc is positioned above the optical reading device, by counting the number of notches in the position-determining annular rib. Only then may the selected disc be clamped on the disc rotation turntable and played.

Thus, the disc transport turntable must be rotated until the standard position is verified, before the selected disc can be transported to the playback components. Therefore, when, for example, the fifth disc in a carousel-type player capable of holding five discs is to be played first, verification of the standard position must first be accomplished by rotating the disc transport turntable to confirm the standard position (ordinarily the position of the holding section for the first disc). Next, the turntable is again rotated to position the selected disc above the disc rotation turntable and optical pickup. Since, in this example, the turntable rotates in a specified direction, a very long access time is required. Moreover, in order to solve this problem and to shorten the access time required in a conventional technique, there is the disadvantage that two sets of detection systems are necessary, one to detect the standard position of the disc transport turntable, and the other to detect the position of the selected disc.

OBJECTS OF THE INVENTION

It is accordingly a principal object of the present invention to provide a multiple optical disc player of the so-called carousel type, in which any selected disc can be delivered to the playback mechanism of the player in a greatly reduced access time, as compared to conventional such players.

It is a further object of the invention to provide a carousel-type optical disc player in which the construction of the player components is rendered simpler and more reliable, by providing structure for detecting the angular position of the disc transport turntable which requires only a single set of position-detecting components, in contrast to the prior art technology which requires two sets of position-detecting components.

It is a still further object of the invention to provide an improved disc transport turntable mechanism for use in carousel-type optical disc players, which enables the improved random access time described above.

It is a yet still further object of the invention to provide a disc transport turntable mechanism for use in carousel-type CD players, in which the turntable mechanism is rendered simpler and more reliable by requiring only one set of position-detecting components, in contrast to the two sets of position-detecting components required in the prior art.

SUMMARY OF THE INVENTION

According to the present invention, there is provided an optical disc playback device comprising a tray for holding a plurality of discs to be played, which tray may be controlled to move into and out of the main body of the player in the manner of a drawer. The tray includes a disc transport turntable that is caused to rotate within the tray and comprises a plurality of disc holding sections arranged about the axis of rotation of the turntable, the disc holding sections corresponding in number to the number of discs to be held in the player.

On the underside of the disc transport turntable, there is provided an axially-extending annular rib having notches formed therein, with the notches indicating the angular position of any selected one of the disc-holding sections of the disc transport turntable. The player also comprises a control device that controls a motor for driving the disc transport turntable upon suitable detection of the notches. The player further comprises an optical pickup subassembly, a disc rotation turntable and a disc clamp provided within the main body of the player, and a disc mounting mechanism which clamps a selected disc using the aforementioned disc clamp, after placing the disc held by one of the disc-holding sections on the disc rotation turntable while the tray is disposed within the main body of the device.

According to the invention, each disc-holding section of the disc transport turntable has associated therewith a distinctive set of notches formed on the axially-extending annular rib. In particular, each set of notches comprises notches formed symmetrically on both sides of a central position-indicating notch, with the notches corresponding to the number assigned to each of the disc holding sections of the disc transport turntable.

The dimensions of the position-indicating notch relative to the disc number-indicating notches disposed symmetrically on either side thereof, are selected such that the rotation of the disc transport turntable is controlled using only a single detection system to detect both the number assigned to the disc-holding section, and the stopping position.

BRIEF DESCRIPTION OF THE DRAWINGS

The above and other objects and advantages of the present invention will be better understood after reading the following detailed description of various preferred embodiments of the invention, taken with reference to the accompanying drawings, in which.

DETAILED DISCUSSION

For ease of explanation, the following description of various preferred embodiments according to the invention will be treated as if those embodiments are modifications to the prior art structure shown in FIGS. 5–7 and discussed above. Accordingly, those elements of the disc player according to the invention which are the same as those of the prior art device depicted in FIGS. 5–7 will be either omitted or designated with like reference numerals.

Figure 1:
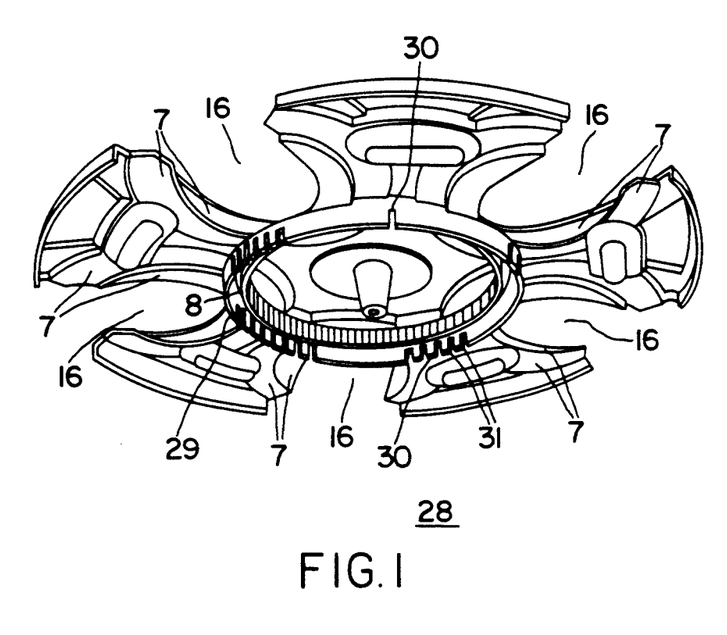
FIG. 1 is a perspective view showing the underside of a disc transport turntable mechanism for use in the present invention.

Referring now to FIG. 1, shown therein is a perspective view from below of a disc transport turntable 28 according to the invention, which is adapted to be rotated on a tray 3 as described above. FIG. 1 shows the axially downwardly projecting annular rib 29 according to the invention, provided with a set of notches for each disc-holding section 7 of the turntable 28, each set of notches comprising a central position-determining notch 30 and disc number-indicating notches 31 disposed symmetrically on either side of the notches 30, and corresponding to the number assigned to each of the disc-holding sections 7.

Figure 2:
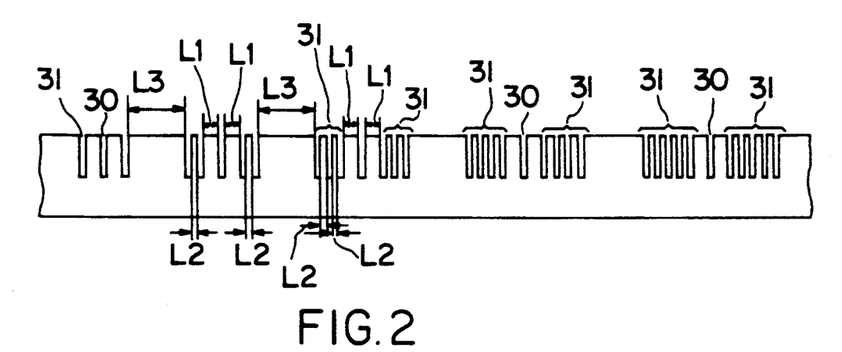
FIG. 2 is a developed view of a segment of the position-indicating annular rib 29 of FIG. 1, showing the dimensions of the notches according to this embodiment.

Referring now to FIG. 2 of the accompanying drawings, it will be seen that each of the position-determining notches 30 has a left and right side whose dimension L1 is greater than the dimension L2 of the spaces between the notches 31 that indicate the number assigned to each of the disc-holding sections 7. Moreover, the length of the dimensions L1 and L2 must be sufficiently long that the control circuit (indicated schematically at 33 in FIG. 8) which functions using the detection emission from the photocoupler 32 (see FIG. 8) can judge whether L1 is greater than L2. In addition, the length L3 between adjacent sets of notches 30, 31 must be greater than the dimension L2.

As for the number of notches, FIG. 2 shows one pair of notches 31 provided to indicate the number one disc-holding section 7, with the pair of notches straddling the central position-indicating notch 30. Similarly, the number two disc-holding section comprises two pairs of notches 31 straddling the central position-determining notch 30 of the second set of notches 30, 31. With reference to FIG. 2, it will be seen that each set of notches comprises notches 31 disposed symmetrically on either side of the central position-indicating notch 30, the number of which notches 31 indicates the unit number of the corresponding disc-holding section 7.

Figure 8:
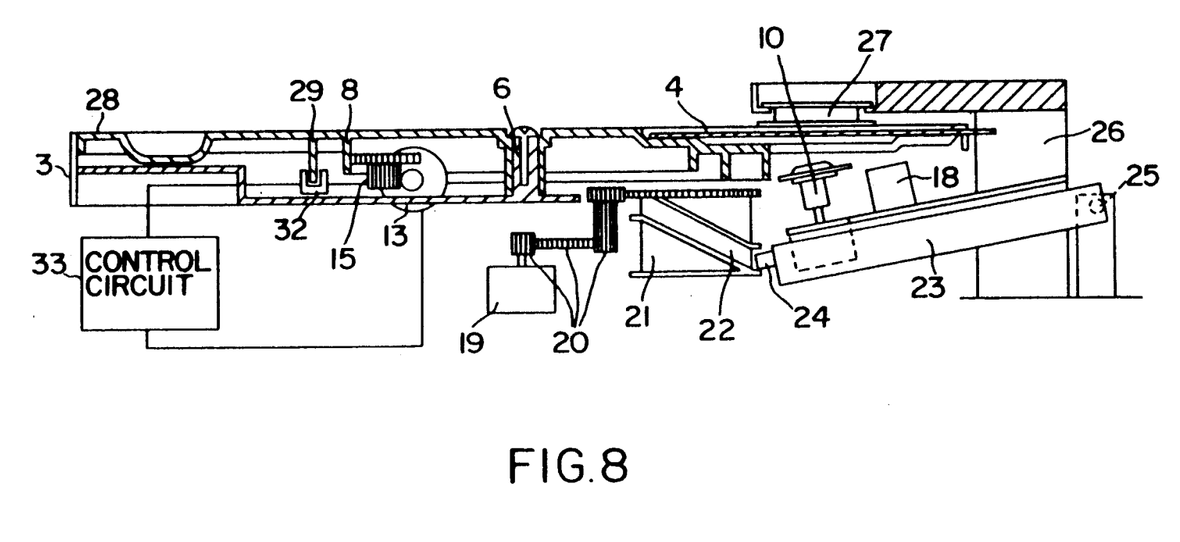
FIG. 8 is a view corresponding to that of FIG. 6, but showing the structure employed according to the present invention.

The disc transport turntable 28 is rotated in order to read the number of the disc-holding sections when the player is ready to play an optical disc. After detecting a length L3 using photocoupler(s) 32 which are so disposed as to straddle the annular rib 29, the control circuitry 33 proceeds to count the number of notches 31 detected by photocoupler 32, and the disc transport turntable 28 is caused to continue its rotation until the same number of notches 31 is counted as the number of the selected disc holding section 7. After counting the same number of notches 31 as the unit number of the selected disc-holding section 7, the dimension L1 will be detected and the turntable 28 is caused to stop at the notch 30 which would be detected next.

Figure 3:
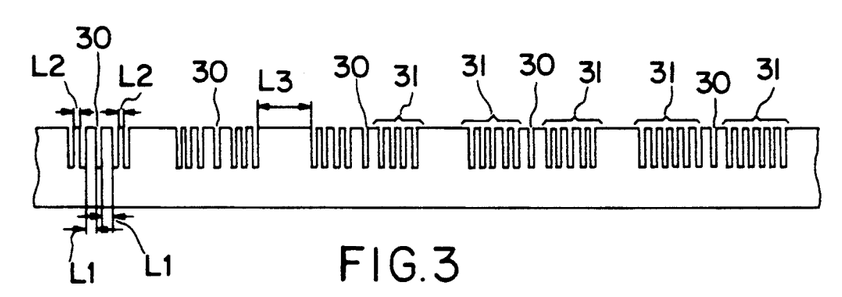
FIG. 3 is a view corresponding to that of FIG. 2, but of a second embodiment according to the invention.

In a second embodiment of the invention, the configuration of the notches in the annular rib 29 can be as shown in FIG. 3. In this example, in addition to the notches of the previous embodiment, further notches 31 are provided on both sides of the central notch 30, such that the dimension L2 can be detected not only for the disc-holding sections number two and higher, but also for the number one disc-holding section 7.

Figure 4:
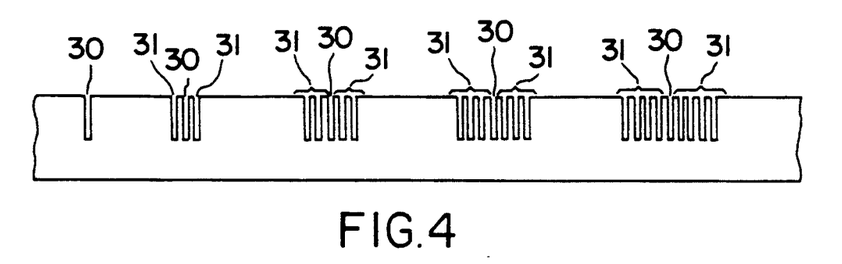
FIG. 4 is a view corresponding to those of FIGS. 2 and 3, but of a third embodiment according to the invention.

A third embodiment according to the invention is shown in FIG. 4 of the accompanying drawings. In this embodiment, the number one disc-holding section 7 has only the position-determining notch 30 corresponding thereto on the annular rib 29. The number two disc-holding section 7 has one notch 31 on either side of the central position-indicating notch 30; however, the spacing between the notches 30, 31 in this embodiment is constant at the dimension L2.

Thus, in this embodiment, the assigned numbers of successive disc-holding sections 7 are determined by providing notches 31 in relation to the unit number of the corresponding disc-holding sections 7 of the disc transport turntable 28. The photocoupler 32 detects the selected disc by computing the assigned number of the corresponding disc-holding sections 7, using the following equation as the notches are detected:

Disc Number = ((number of notches in the rib) + 1) ÷ 2

When the selected disc number is detected according to the above formula, the turntable 28 is caused to rotate in the reverse direction, and is caused to stop upon detecting notches 31 equal in number to the assigned number of the selected disc.

In will be appreciated from the above that the present invention permits random access to any selected one of a plurality of discs received within a disc transport turntable, in a very short access time. Even if only one disc is present in the turntable, the advantages of the present invention are nonetheless realized, because the access to that disc is dependent on the number of disc-holding sections 7 formed in the turntable, rather than the number of discs actually present in the tray.

Moreover, the present invention accomplishes its objects using fewer components than the prior art described herein, as it is necessary to provide only one annular rib for position indication, and a single detection system to control the stopping position and recognize the assigned number of the selected disc-holding section.

It will be recognized that, although the invention has been described in connection with carousel-type players having a tray that moves into and out of a front control panel, it is equally applicable to the somewhat less expensive carousel-type players in which the tray is fixed inside the player, and the turntable is accessed through a hinged lid forming the top of the player housing.

It is contemplated that the optical disc playback device according to the invention will be designed primarily for optical discs of the Compact Disc Digital Audio format. However, it will be appreciated by those skilled in the art that the construction principles taught by the present invention may be used to design players for optical discs of other formats, including, without limitation, CD-ROM, CD-I, CD-V, CD-WO, erasable CD, CD+G, CD+MIDI, CD-3, and other formats yet to be put in commercial use.

Although the present invention has been described in connection with various preferred embodiments thereof, it will be appreciated that those embodiments are set forth solely for purposes of illustration, and should not be construed as limiting in any way the true scope and spirit of the invention as set forth in the appended claims.

We claim:

1. An optical disc playback device, comprising a housing, a disc transport turntable rotatably mounted within said housing, said disc transport turntable being adapted to receive a plurality of optical discs and upon rotation of said turntable to transport said discs within said housing to a corresponding plurality of predetermined locations, a disc-rotating and optical read-out subassembly disposed within said housing adjacent one of said predetermined locations; said turntable comprising a plurality of disc-holding sections and an axially extending annular rib formed on its underside; said annular rib having formed therein a distinct set of notches corresponding to each of said disc-holding sections, each said set of notches comprising a central position-indicating notch and disc number-indicating notches disposed symmetrically on both sides of said central position-indicating notch; said device further comprising optical detecting means cooperating with said annular rib to detect a presence or absence of said notches.

2. The optical disc playback device according to claim 1, further comprising a motor for driving said disc transport turntable in rotation within said housing, and control circuitry receiving an output of said optical detecting means and operating to stop said motor when said optical detecting means detects one of said set of notches corresponding to a selected one of said plurality of disc-holding sections.

3. The optical disc playback device according to claim 2, wherein each of said plurality of disc-holding sections has an assigned disc number, and said control circuitry recognizes a selected said disc number according to the equation $$\text{disc number} = ((\text{number of detected notches}) + 1) \div 2;$$

whereby said set of notches corresponding to one of said plurality of disc-holding sections assigned a disc number of one consists of only said central position-indicating notch.

4. The optical disc playback device according to claim 1, wherein each said distinct set of notches comprises an odd number of notches.

5. The optical disc playback device according to claim 1, wherein said disc number-indicating notches of each set of notches are spaced from said central position-indicating notch a distance L1 greater than a distance L2 by which said disc number-indicating notches are spaced from each other.

6. The optical disc playback device according to claim 1, wherein each of said plurality of disc-holding sections is assigned a disc number, and wherein each said distinct set of notches includes disc number-indicating notches disposed on either side of said central position-indicating notch equal in number to the disc number of its respective disc-holding section.

7. The optical disc playback device according to claim 1, wherein each of said plurality of disc-holding sections is assigned a disc number, and wherein each said distinct set of notches includes disc number-indicating notches disposed on either side of said central position-indicating notch one greater in number to the disc number of its respective disc-holding section.

8. The optical disc playback device according to claim 5, wherein each of said plurality of disc-holding sections is assigned a disc number, and wherein each said distinct set of notches includes disc number-indicating notches disposed on either side of said central position-indicating notch equal in number to the disc number of its respective disc-holding section.

9. The optical disc playback device according to claim 5, wherein each of said plurality of disc-holding sections is assigned a disc number, and wherein each said distinct set of notches includes disc number-indicating notches disposed on either side of said central position-indicating notch one greater in number to the disc number of its respective disc-holding section.

10. An optical disc playback device, comprising a housing, a tray disposed within said housing, a disc transport turntable rotatably mounted on said tray, said disc transport turntable being adapted to receive a plurality of optical discs and upon rotation of said turntable to transport said discs within said housing to a corresponding plurality of predetermined locations, a disc-rotating and optical read-out subassembly disposed within said housing adjacent one of said predetermined locations; said turntable comprising a plurality of disc-holding sections and an axially extending annular rib formed on its underside; said annular rib having formed therein a distinct set of notches corresponding to each of said disc-holding sections, each said set of notches comprising a central position-indicating notch and disc number-indicating notches disposed symmetrically on both sides of said central position-indicating notch; said device further comprising optical detecting means co-operating with said annular rib to detect a presence or absence of said notches.

11. The optical disc playback device according to claim 10, wherein said tray is adapted to move into and out of a front control panel of said housing.

12. The optical disc playback device according to claim 10, further comprising a motor for driving said disc transport turntable in rotation relative to said tray, and control circuitry receiving an output of said optical detecting means and operating to stop said motor when said optical detecting means detects one of said set of notches corresponding to a selected one of said plurality of disc-holding sections.

13. The optical disc playback device according to claim 12, wherein each of said plurality of disc-holding sections has an assigned disc number, and said control circuitry recognizes a selected said disc number according to the equation $$\text{disc number} = ((\text{number of detected notches}) + 1) \div 2;$$

whereby said set of notches corresponding to one of said plurality of disc-holding sections assigned a disc number of one consists of only said central position-indicating notch.

14. The optical disc playback device according to claim 10, wherein each said distinct set of notches comprises an odd number of notches.

15. The optical disc playback device according to claim 10, wherein said disc number-indicating notches of each set of notches are spaced from said central position-indicating notch a distance L1 greater than a distance L2 by which said disc number-indicating notches are spaced from each other.

16. The optical disc playback device according to claim 10, wherein each of said plurality of disc-holding sections is assigned a disc number, and wherein each said distinct set of notches includes disc number-indicating notches disposed on either side of said central position-indicating notch equal in number to the disc number of its respective disc-holding section.

17. The optical disc playback device according to claim 10, wherein each of said plurality of disc-holding sections is assigned a disc number, and wherein each said distinct set of notches includes disc number-indicating notches disposed on either side of said central position-indicating notch one greater in number to the disc number of its respective disc-holding section.

18. The optical disc playback device according to claim 15, wherein each of said plurality of disc-holding sections is assigned a disc number, and wherein each said distinct set of notches includes disc number-indicating notches disposed on either side of said central position-indicating notch equal in number to the disc number of its respective disc-holding section.

19. The optical disc playback device according to claim 15, wherein each of said plurality of disc-holding sections is assigned a disc number, and wherein each said distinct set of notches includes disc number-indicating notches disposed on either side of said central position-indicating notch one greater in number to the disc number of its respective disc-holding section.

* * * * *